(12) United States Patent
Neet (10) Patent No.: US 12,388,311 B2
(45) Date of Patent: Aug. 12, 2025

(54) STATOR WINDING WITH MULTIPLE SHIFTS IN PHASE BELT

(71) Applicant: BorgWarner Inc., Auburn Hills, MI (US)

(72) Inventor: Kirk Neet, Noblesville, IN (US)

(73) Assignee: BorgWarner Inc., Auburn Hills, MI (US)

(*) Notice: Subject to any disclaimer, the term of this patent is extended or adjusted under 35 U.S.C. 154(b) by 111 days.

(21) Appl. No.: 17/551,556

(22) Filed: Dec. 15, 2021

(65) Prior Publication Data

US 2022/0190666 A1  Jun. 16, 2022

Related U.S. Application Data

(60) Provisional application No. 63/125,919, filed on Dec. 15, 2020.

(51) Int. Cl.
*H02K 3/28* (2006.01)

(52) U.S. Cl.
CPC .................................. *H02K 3/28* (2013.01)

(58) Field of Classification Search
CPC .......................... H02K 3/28; H02K 2213/09
See application file for complete search history.

(56) References Cited

U.S. PATENT DOCUMENTS

| 7,034,428 | B2 | 4/2006 | Cai et al. | |
|---|---|---|---|---|
| 2002/0017825 | A1* | 2/2002 | Oohashi | H02K 3/28 310/207 |
| 2005/0012425 | A1* | 1/2005 | Tsukamoto | H02K 3/12 310/216.074 |
| 2016/0105065 | A1* | 4/2016 | Takahashi | H02K 3/42 310/83 |
| 2018/0034335 | A1 | 2/2018 | Neet et al. | |
| 2018/0097431 | A1* | 4/2018 | Laldin | H02K 3/28 |
| 2019/0027977 | A1* | 1/2019 | Saito | H02K 2213/09 |
| 2020/0052537 | A1* | 2/2020 | Yoon | H02K 3/28 |
| 2020/0052561 | A1* | 2/2020 | Neet | H02K 3/28 |
| 2020/0220404 | A1* | 7/2020 | Neet | H02K 2213/09 |

FOREIGN PATENT DOCUMENTS

| DE | 102019132044 A1 * | 5/2020 | ............ H02K 1/16 |
|---|---|---|---|
| GB | 2616095 A * | 8/2023 | ............ H02K 1/16 |

OTHER PUBLICATIONS

17551556_2024-09-14_DE_102019132044_A1_H.pdf(Year: 2024).*

* cited by examiner

*Primary Examiner* — Christopher M Koehler
*Assistant Examiner* — Ahmed F Seck
(74) *Attorney, Agent, or Firm* — Maginot, Moore & Beck, LLP

(57) ABSTRACT

A method and arrangement is disclosed herein for making a stator winding arrangement with multiple phase shift end turns. The winding arrangement is configured for use with conductors provided in multiple parallel paths and in 2-6-6-2 slot sets in each phase.

25 Claims, 7 Drawing Sheets

| 40  Slot # | 1 | 2 | 3 | 4 |
|---|---|---|---|---|
| Layer 1 | X | X | | |
| Layer 2 | X | X | | |
| Layer 3 | | X | X | |
| Layer 4 | | X | X | |
| Layer 5 | | X | X | |
| Layer 6 | | X | X | |
| Layer 7 | | | X | X |
| Layer 8 | | | X | X |

| 40  Slot # | 1 | 2 | 3 | 4 | |
|---|---|---|---|---|---|
| Layer 1 | A | B | | | ⎫ 1st wrap |
| Layer 2 | C | D | | | ⎭ |
| Layer 3 | | A | B | | ⎫ 2nd wrap |
| Layer 4 | | C | D | | ⎭ |
| Layer 5 | | A | B | | ⎫ 3rd wrap |
| Layer 6 | | C | D | | ⎭ |
| Layer 7 | | | A | B | ⎫ 4th wrap |
| Layer 8 | | | C | D | ⎭ |

STATOR WINDING WITH MULTIPLE SHIFTS IN PHASE BELT

CROSS-REFERENCE TO RELATED APPLICATIONS

The present application claims priority from U.S. Provisional Patent Application Ser. No. 63/125,919, filed Dec. 15, 2020, the entire contents of which are incorporated herein by reference.

FIELD

The present disclosure relates to the field of electric machines, and more particularly, stator winding arrangements and connections for such winding arrangements.

BACKGROUND

Electric machines are designed to meet specific operating requirements based on the intended application the electric machine. Depending on the specific design, the machine will have various performance characteristics. Examples of design features that contribute to operating performance include stator size, rotor size, torque output, efficiency, type and arrangement of the of windings, number of stator slots, number of poles, slots per pole per phase, number of conductors per slot, number of parallel paths per phase, number of turns, and any of various other design parameters as will be recognized by those of ordinary skill in the art.

One desired performance characteristic for electric machines is reduced torque ripple and reduced audible noise. The 4-8-4 winding arrangement has proven to reduce torque ripple in many electric machines. A 4-8-4 winding arrangement is one defined by three slots-per-pole-per-phase wherein the conductors for each phase are arranged in slot sets having a 4-8-4 configuration. For each pole of the winding arrangement in this configuration, four conductors of a particular phase are arranged in a first slot, eight conductors of the same phase are arranged in an immediately adjacent second slot, and four conductors of the same phase are arranged in a third slot that is immediately adjacent to the second slot. This conductor pattern is then repeated again and again throughout the winding. Although the 4-8-4 winding arrangement results in reduced torque ripple and reduced audible noise, it would be desirable to reduce provide a winding arrangement that reduces torque ripple and audible noise to an even greater extent.

While it would be desirable to provide an electric machine that provides one or more of the foregoing or other advantageous features, as may be apparent to those reviewing this disclosure, the teachings disclosed herein extend to those embodiments which fall within the scope of any appended claims, regardless of whether they accomplish one or more of the above-mentioned advantages.

SUMMARY

In at least one embodiment a stator for an electric machine includes a stator core with slots formed in the stator core and a multi-phase winding arrangement positioned on the stator core. Each phase of the winding arrangement includes a plurality of conductors defining in-slot portions and end-turns connecting the in-slot portions. The in-slot portions are arranged in layers in each of the slots. The plurality of conductors further define a phase belt comprising a plurality of paths winding through the layers of the slots. The winding arrangement is further defined by four slots-per-pole-per-phase such that each pole of each phase of the winding arrangement is defined by a slot set having four slots with conductors arranged in the four slots in a 2-6-6-2 layer configuration.

In at least one embodiment, a stator for an electric machine comprises a stator core with slots formed in the stator core and a multi-phase winding arrangement positioned on the stator core. Each phase of the winding arrangement includes a plurality of conductors defining in-slot portions and end-turns connecting the in-slot portions. The in-slot portions are arranged in layers in each of the slots. The plurality of conductors define a phase belt comprising a plurality of paths winding through the layers of the slots. The winding arrangement is further defined by four slots-per-pole-per-phase such that each pole of each phase of the winding arrangement is defined by a slot set having four slots with conductors arranged in the four slots in a 2-6-6-2 layer configuration.

DESCRIPTION

Figure 1A:
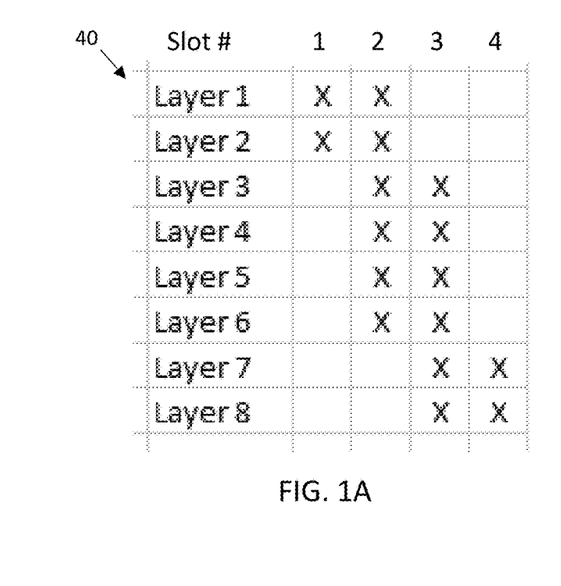
FIG. 1A is a table illustrating the position of conductors in the layers of one slot set (comprised of four consecutive slots) of a first embodiment of a 2-6-6-2 layer configuration for a winding arrangement.

A stator winding arrangement is disclosed herein having multiple shifts in the phase belt. The winding arrangement includes a number of phase shift end turns that are strategically located in each path of the winding between different wraps of the winding path. The winding arrangement is further configured with slot sets having a 2-6-6-2 layer configuration. As a result of this configuration, the winding arrangement has reduced audible noise in operation.
Winding Arrangement With reference now to FIGS. 1A-3, a first embodiment of a multiple phase winding arrangement is shown. FIG. 1A shows the arrangement of conductors 32 in one slot set 40 of one phase of the multi-phase winding arrangement. As shown in FIG. 1A, the conductors 32 of the winding arrangement are positioned the in slots of a stator core configured for eight layers (i.e., eight conductors per slot). The conductors 32 of the winding arrangement are grouped into slot sets comprised of four consecutive slots having a 2-6-6-2 layer configuration. In particular, for each slot set 40 of each phase, two conductors (per phase) are arranged in layers one and two of the first slot of the slot set; six conductors (per phase) are arranged in layers one through six of the second slot; six conductors (per phase) are arranged in layers three through eight of the third slot; and two conductors (per phase) are arranged in the fourth slot of each slot set. Although not illustrated in FIG. 1A, it will be recognized that the slot sets 40 of different phases overlap (e.g., slot one of a slot set for a first phase may also be slot three of a slot set for a second phase, slot two of the slot set for the first phase may be slot four of the slot set for the second phase, etc.).

Figure 1B:
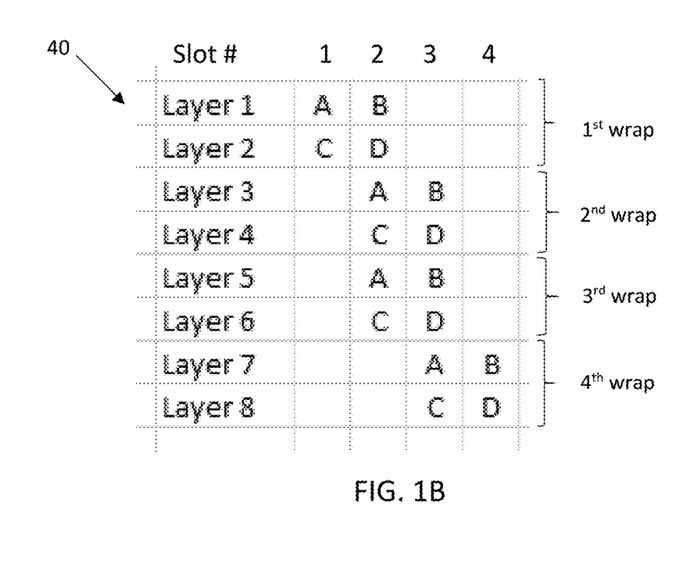
FIG. 1B is a table illustrating an exemplary position of the conductors in the slot set of FIG. 1A when four conductor paths/wires are used to form the 2-6-6-2 layer configuration.

FIG. 1B shows a more detailed version of FIG. 1A by identifying particular conductor paths for the winding phase. As shown in FIG. 1B, the winding arrangement is comprised of four conductor paths per phase (which conductor paths for each phase may also be referred to herein as a "wire" of the phase belt). Each of the four conductor paths is represented by one of letters A, B, C or D in FIG. 1B. Each conductor path may be provided by a continuous bar or elongated length of wire (i.e., cascaded conductors). Alternatively, each conductor path may be provided by an interconnected series of segmented wires or other conductors that are welded or otherwise connected together (which segmented conductors may also be referred to as "U-shaped conductors" or "hairpin conductors"). An example of a stator with segmented conductors used to form a winding is shown in US Patent Publication No. 2021/0159743, the contents of which are incorporated herein by reference.

Figure 2:
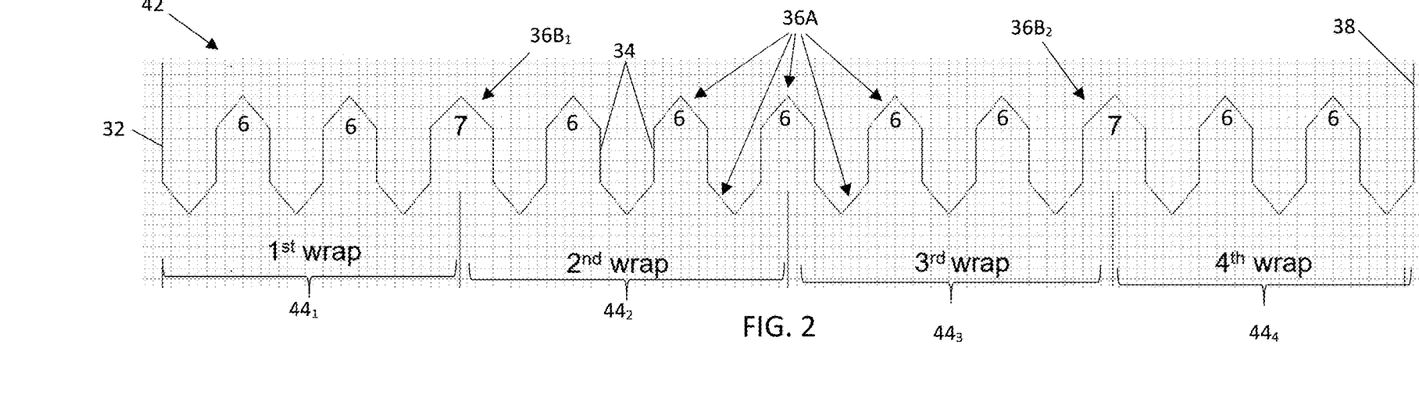
FIG. 2 is a schematic view of one conductor path for a winding arrangement with the 2-6-6-2 layer configuration of FIG. 1B, the schematic view illustrating that the conductor path wraps around the stator core four times with long pitch end turns positioned at select locations.

With reference now to FIG. 2, a schematic view is shown for one conductor path 42 for the winding arrangement having a 2-6-6-2 layer configuration of FIG. 1B (e.g., path A). As illustrated in this figure, each path (A, B, C and D) of the winding arrangement with a 2-6-6-2 layer configuration winds through the slots of the stator core and wraps around the stator core four times (i.e., the conductor path 42 zig-zags through the slots such that the conductor travels around the stator core for four complete or substantially complete revolutions). The four wraps 44 of the path 42 are noted in FIG. 2 by $1^{st}$ Wrap $44_1$, $2^{nd}$ Wrap $44_2$, $3^{rd}$ Wrap $44_3$, and $4^{th}$ Wrap $44_4$. Each path 42 includes in-slot portions 34 that extend through the slots of the stator core, and end turns 36 (which may alternatively be referred to as "end loops") that extend between the in-slot portions. These in-slot portions 34 and end turns 36 will be recognized to those of ordinary skill in the art, and are also described in further detail below with reference to FIG. 10.

The winding arrangement 30 stator core shown in FIG. 2 includes thirty-six slots. Most of the end turns are standard end turns 36A that have a standard pitch. In the embodiment of FIG. 2, the standard pitch is equal to six slots. This is noted by the numeral "6" show in association with standard end turns 36A of FIG. 2. While the embodiment of FIG. 6 provides for a standard pitch of six, it will be recognized that in other embodiments the standard pitch may be different than six. In addition to the standard end turns 36A, at least some of the end turns are non-standard end turns 36B. These non-standard end turns 36B have a non-standard pitch that is different than the standard pitch. This is noted by the numeral "7" shown in association with the non-standard end turns 36B of FIG. 2. The non-standard end turns include both "phase shift" end turns and "nested end turns." As will be appreciated from the following disclosure, phase shift end turns shift the position of slot sets within a path (e.g., the position of paths A and B are moved a number of slots to the left or the right from one wrap to the next). Nested end turns switch the position of paths within a slot set (e.g., the position of paths A and B are switched).

The phase shift end turns are positioned in each path 42 between certain wraps 44 of the path. For example, as shown in FIG. 2, after the first wrap $44_1$ of a given path (i.e., one of paths A, B, C or D), a non-standard end turn $36B_1$ on the lead end of the stator core has a long pitch of seven. As a result, this end turn $36B_1$ provides a first phase shift end turn between the $1^{st}$ wrap $44_1$ and the $2^{nd}$ wrap $44_2$. This non-standard end turn $36B_1$ shifts the wire one slot on the stator core for the subsequent wrap (i.e., wire is shifted one slot on the stator core for the $2^{nd}$ wrap $44_2$ relative to the first wrap $44_1$, as best shown in FIG. 1B). While the first phase shift end turn $36B_1$ is disclosed in FIG. 2 as a long pitch end turn having a pitch of seven, it will be recognized that this first phase shift end turn may alternatively be a short pitch end turn (e.g., a pitch of five) that also serves to shift the wire one slot on the stator core for the next wrap. When a short pitch end turn is used, the short pitch end turn shifts the wire in the opposite direction from that of a long pitch end turn.

Similar to the first phase shift end turn $36B_1$ positioned between the $1^{st}$ wrap and the $2^{nd}$ wrap, the conductor path 42 also includes a second phase shift end turn $36B_2$ positioned between the $3^{rd}$ wrap and the $4^{th}$ wrap on the lead end of the stator core. In the embodiment of FIG. 2, the second phase shift end turn $36B_2$ has the same pitch as the first phase shift end turn $36B_1$ (i.e. a pitch of seven), and thus shifts the wire another slot in the same direction as that of the first phase shift end turn (i.e., as best shown in FIG. 1B, the $4^{th}$ wrap is shifted one slot to the right of the $3^{rd}$ wrap).

FIG. 2 shows one path 42 (e.g., path A) of the winding arrangement 30 in isolation. However, as noted previously in association with FIG. 1B, each phase of the winding arrangement 30 includes four conductors paths (i.e., paths A, B, C and D). In at least one embodiment, the four paths are all connected in parallel (i.e., paths A, B, C and D are all connected in parallel), to result in four parallel paths per phase. In another embodiment, two of the four paths are connected in series (e.g., paths A and D are connected in series and paths B and C are connected in series) to result in only two parallel paths per phase. In the case where the four wires (A, B, C, D) are all connected in parallel, it will be noted that a plurality over-under end turns are provided (which may also be referred to herein as "nested" end turns). The over-under end turns are used to distribute each of the wires evenly in the slots of the stator core by switching the position of the wires in the slots. By switching the position of the wires in the slots, each of the wires can be more evenly distributed across the slots in order to provide a balanced winding arrangement. For the most balanced machine, there would be at least one set of over-under end turns per wrap, thus switching the position of the conductors at least once per wrap around the stator core.

Figure 3:
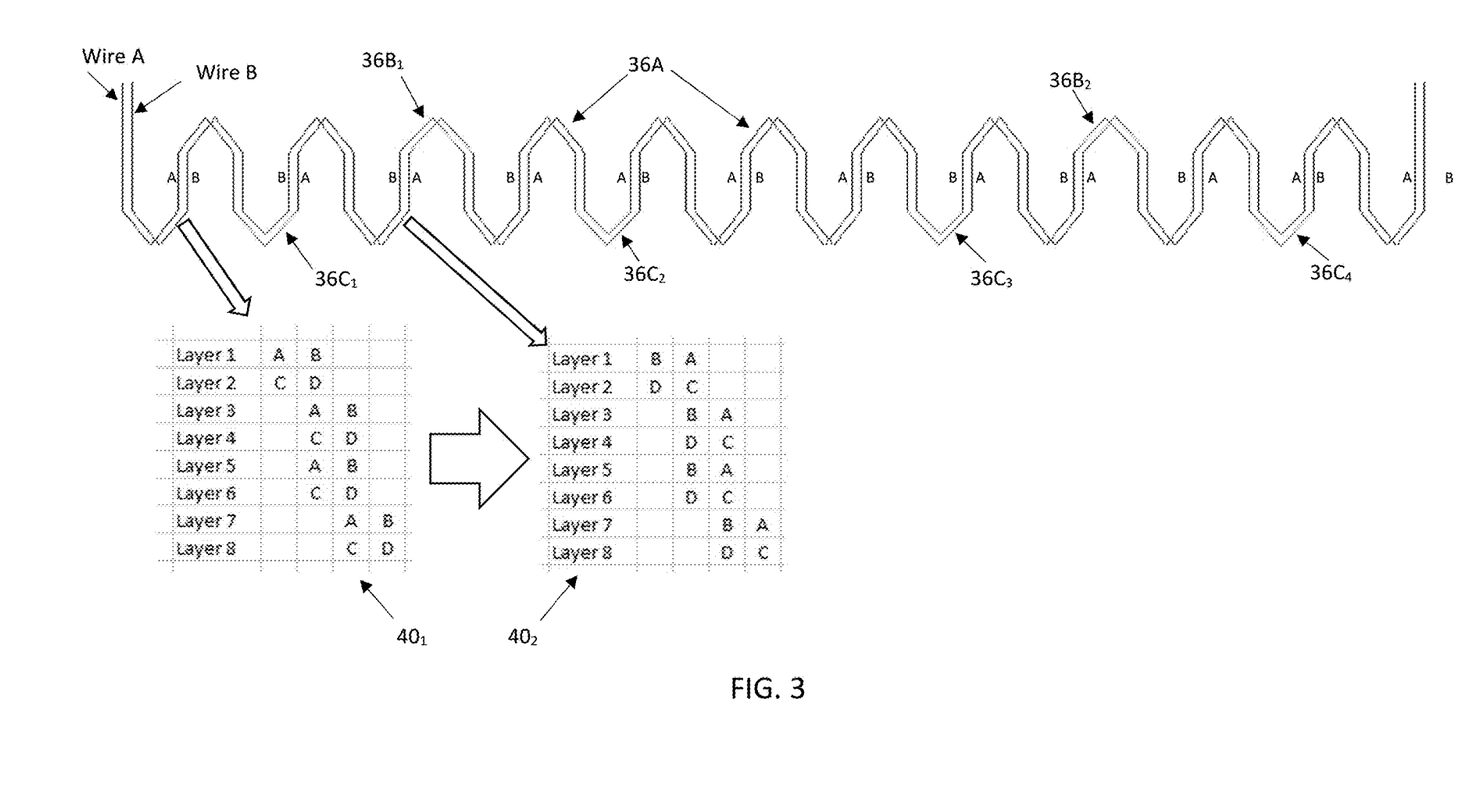
FIG. 3 is a schematic view of two conductors paths for the winding arrangement having the 2-6-6-2 layer configuration of FIG. 1B, the schematic view illustrating over-under/nested end turns used to switch the position of the conductors in the slots in order to provide a balanced winding arrangement.

As noted above, the non-standard end turns of the winding arrangement 30 include nested end turns in addition to phase shift end turns. FIG. 3 illustrates how nested end turns cause two wires (e.g., wires A and B, as shown in FIG. 3) to switch positions in the slot sets. As shown in FIG. 3, before the first set of nested end turns $36C_1$ (i.e., before the slots to the left of the identified over-under end turn $36C_1$), wire A is in the slot immediately before wire B in the slot set $40_1$ (i.e., wire A is in the left slot and wire B is in the right slot). However, after the over-under end turns $36C_1$ (i.e., to the right of the identified over-under end turns $36C_1$), wire A is in the slot immediately after wire B within the slot set $40_2$ (i.e., wire B is in the left slot and wire A is in the right slot). Similarly, the position of wires A and B switch positions in the slot sets following each of nested end turns $36C_2$, $36C_3$ and $36C_4$. While FIG. 3 only illustrates two wires (A and B), it will be recognized that the same over-under end turns are implemented with respect to the other two wires (C and D) for the phase. Moreover, the tables describing the slot sets $40_1$ and $40_2$ in FIG. 3 only illustrate the positions of the conductors in two of the slot sets, and it will be recognized that the slot positions of such conductors change throughout the winding arrangement as a result of the above-described over-under end turns $36C_2$, $36C_3$ and $36C_4$, as well as the long/short pitch end turns 36B1 and 36B2 that provide phase shifts, as described above in association with FIG. 2.

While FIG. 3 illustrates one exemplary arrangement of conductor paths with nested end turns 36C, it will be recognized that numerous different arrangements for the nested end turns may be implemented in various winding arrangements. For example, the number of nested end turns can be increased for each wrap. As another example, all end turns may be nested end turns 36C, or only the end turns on the lead end of (or, alternatively, the opposite/bottom end) may be nested end turns. When half the number of poles of the winding arrangement is an odd number, the nested end turns may be positioned on the bottom of the stator (i.e., the side away from the leads). For example, the winding arrangement shown in FIGS. 1A-3 has six poles, and half the number of poles is odd (i.e., 6/2=3, and 3 is odd). Because half the number of poles is odd, the nested end turns in FIG. 3 are located on the bottom end of the stator. On the other hand, when half the number of poles is an even number (e.g., 8/2=4), the over-under end turns in the middle of the winding may be positioned on the upper (lead) end of the stator.

First Alternative Embodiment of Winding Arrangement

Figure 4A:
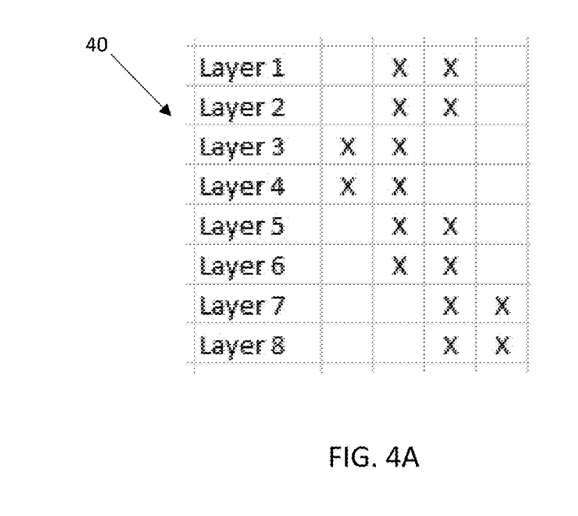
FIG. 4A is a table illustrating the position of conductors in the layers of four consecutive slots of a second embodiment of a winding arrangement having a 2-6-6-2 layer configuration.
Figure 4B:
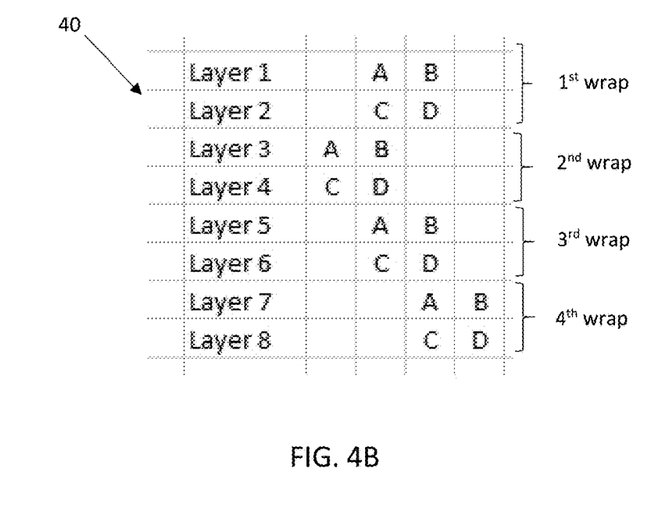
FIG. 4B is a table illustrating the position of the conductors when four conductors paths are used to form the 2-6-6-2 layer configuration of FIG. 4A.
Figure 5:
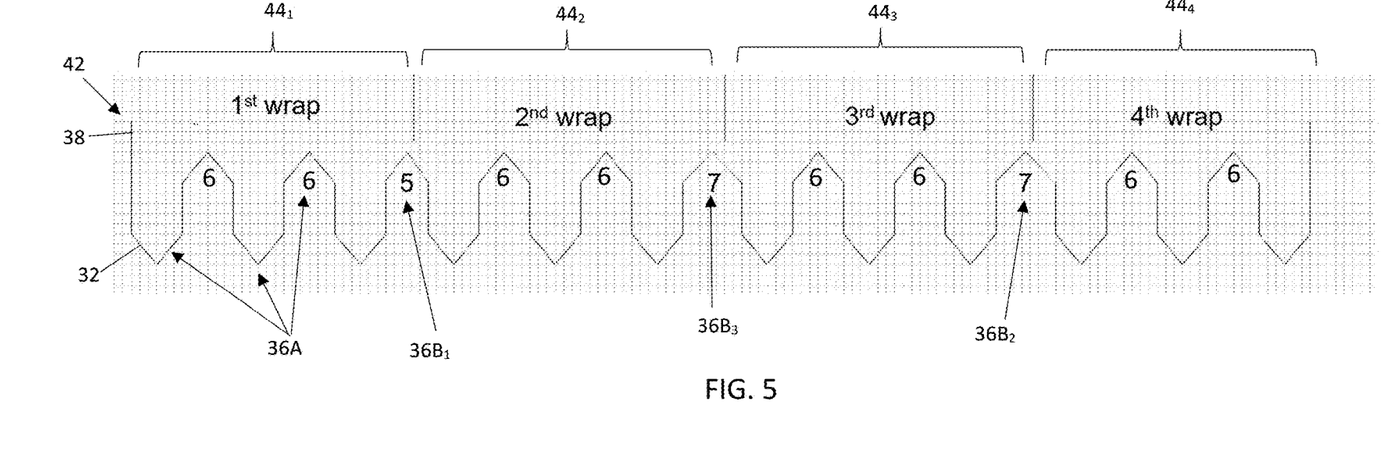
FIG. 5 is a schematic view of one conductor path for the winding arrangement having the 2-6-6-2 layer configuration of FIG. 4B, the schematic view illustrating that the conductor path wraps around the stator core four times with long pitch and short pitch end turns positioned at select locations.

With reference now to FIGS. 4A, 4B and 5, a first alternative embodiment of the winding arrangement with multiple phase shift end turns is shown. The winding arrangement in the embodiment of FIGS. 4A-5 is similar to that shown in FIGS. 1A-3, but the arrangement of the conductors in the stator slots is different, as well as the arrangement and configuration of the phase shift end turns. In the embodiment of FIGS. 4A-5, each path is provided by a conductor that wraps around the stator core four times. The end turns 36 of the path are mostly standard end turns 36A. Again, in this embodiment the standard end turns have a pitch equal to six. After the first wrap, a first non-standard end turn $36B_1$ (i.e., pitch=5) is provided which shifts the wire one slot for the second wrap $44_2$ relative to the first wrap $44_1$. This shift can be seen in FIG. 4B, which shows the slot set for the second wrap shifted one slot to the left relative to the first wrap. After the second wrap $44_2$, another non-standard end turn $36B_3$ shifts back the wire one slot in the opposite direction (i.e., pitch=7). This shift can be seen in FIG. 4B, which shows the slot set for the third wrap $44_3$ shifted one slot to the right relative to the second wrap $44_2$ (i.e., back to the position of the first wrap). After the third wrap, another non-standard end turn shifts the wire another slot in the same direction as the second phase shift end turn (pitch=7). Again, this shift can be seen in FIG. 4B, which shows the slot set 40 for the fourth wrap $44_4$ shifted one slot to the right relative to the third wrap $44_3$. This winding arrangement of FIGS. 4A-5 may be described as having phase shift end turn pitches of five-seven-seven, respectively. However, it will be recognized that other embodiments of this winding arrangement are contemplated. For example, in at least one alternative embodiment, the winding arrangement alternatively has phase shift end turn pitches of seven-five-five.

Second Alternative Embodiment of the Winding Arrangement

Figure 6A:
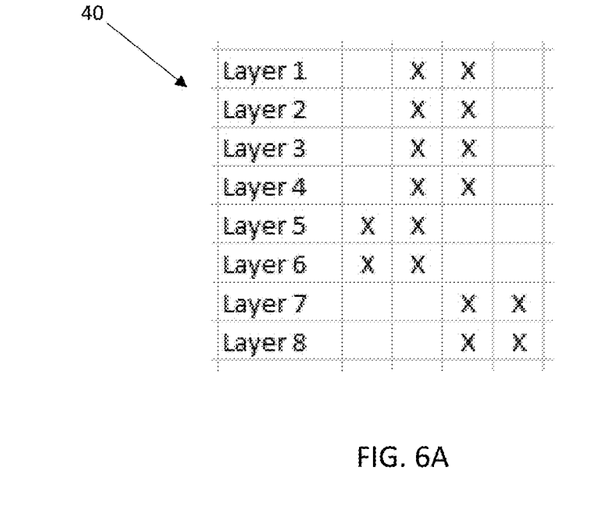
FIG. 6A is a table illustrating the position of conductors in the layers of four consecutive slots of a third embodiment of a winding arrangement having a 2-6-6-2 layer configuration.
Figure 6B:
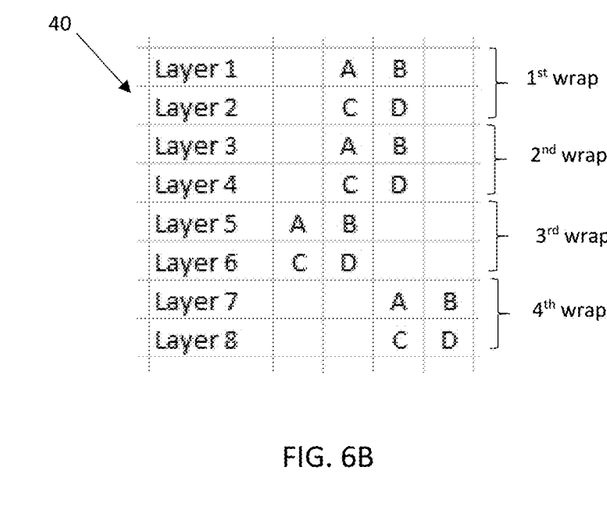
FIG. 6B is a table illustrating the position of the conductors when four conductors paths are used to form the winding arrangement having a 2-6-6-2 layer configuration of FIG. 6A.
Figure 7:
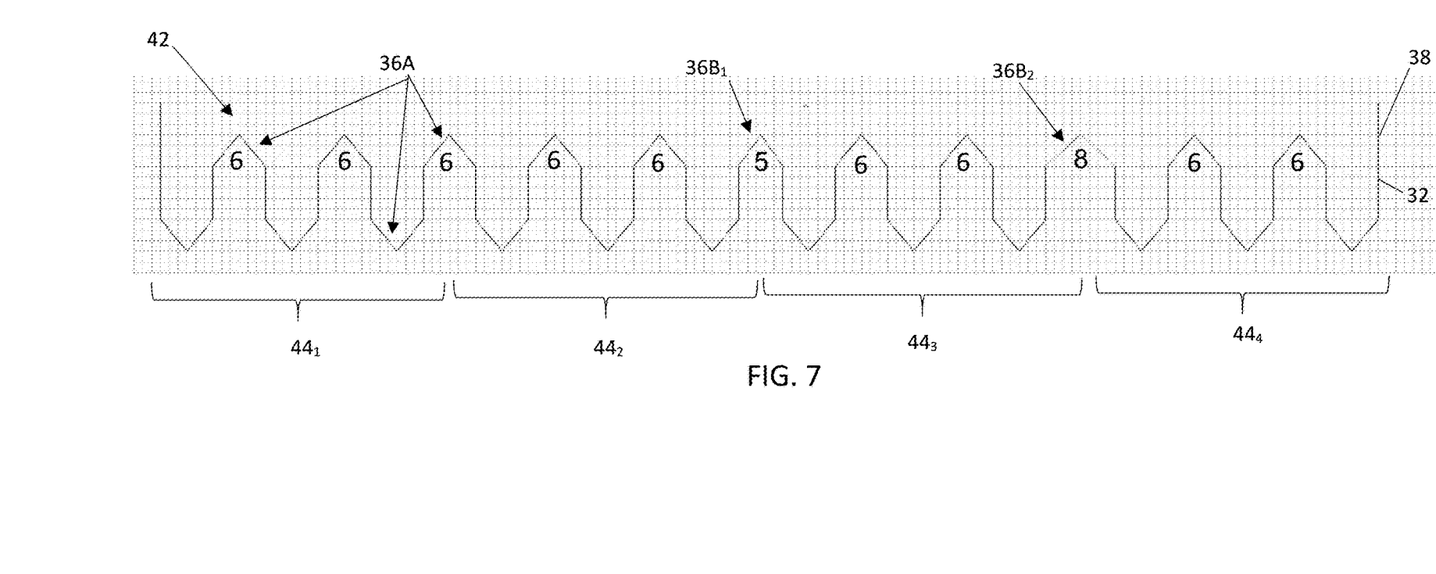
FIG. 7 is a schematic view of one conductor path for the winding arrangement having the 2-6-6-2 layer configuration of FIG. 6B, the schematic view illustrating that the conductor path wraps around the stator core four times with long pitch and short pitch end turns positioned at select locations.

With reference now to FIGS. 6A, 6B and 7, a second alternative embodiment of the winding arrangement with multiple phase shift end turns is shown. The winding arrangement in the embodiment of FIGS. 6A, 6B and 7 is similar to that shown in FIGS. 1A-2 (as well as 4A-5), but again, the arrangement of the conductors in the stator slots is different as well as the arrangement and configuration of the phase shift end turns. In the embodiment of FIGS. 6A-7, each wire wraps around the stator core four times with a standard pitch equal to six. After the second wrap, a first non-standard end turn $36B_1$ having a pitch equal to five shifts the wire one slot for the third wrap $44_3$ relative to the first and second wraps $44_1$, $44_2$. This shift can be seen in FIG. 6B, which shows the slot set for the third wrap shifted one slot to the left relative to the first wrap and the second wrap. After the third wrap, a non-standard end turn $36B_2$ having a pitch equal to eight shifts the wire to the right two slots. Again, this shift can be seen in FIG. 6B, which shows the slot set for the fourth wrap $44_4$ shifted two slots to the right relative to the third wrap $44_3$, and one slot to the right relative to the first and second wraps $44_1$, $44_2$. This winding arrangement of FIGS. 6A-7 may be described as having phase shift end turn pitches of five and eight, respectively. However, it will be recognized that other embodiments of this winding arrangement are contemplated. For example, in at least one alternative embodiment, the winding arrangement alternatively has phase shift end turn pitches of seven and four, respectively.

Parallel and/or Series Connections of the Paths

Figure 8:
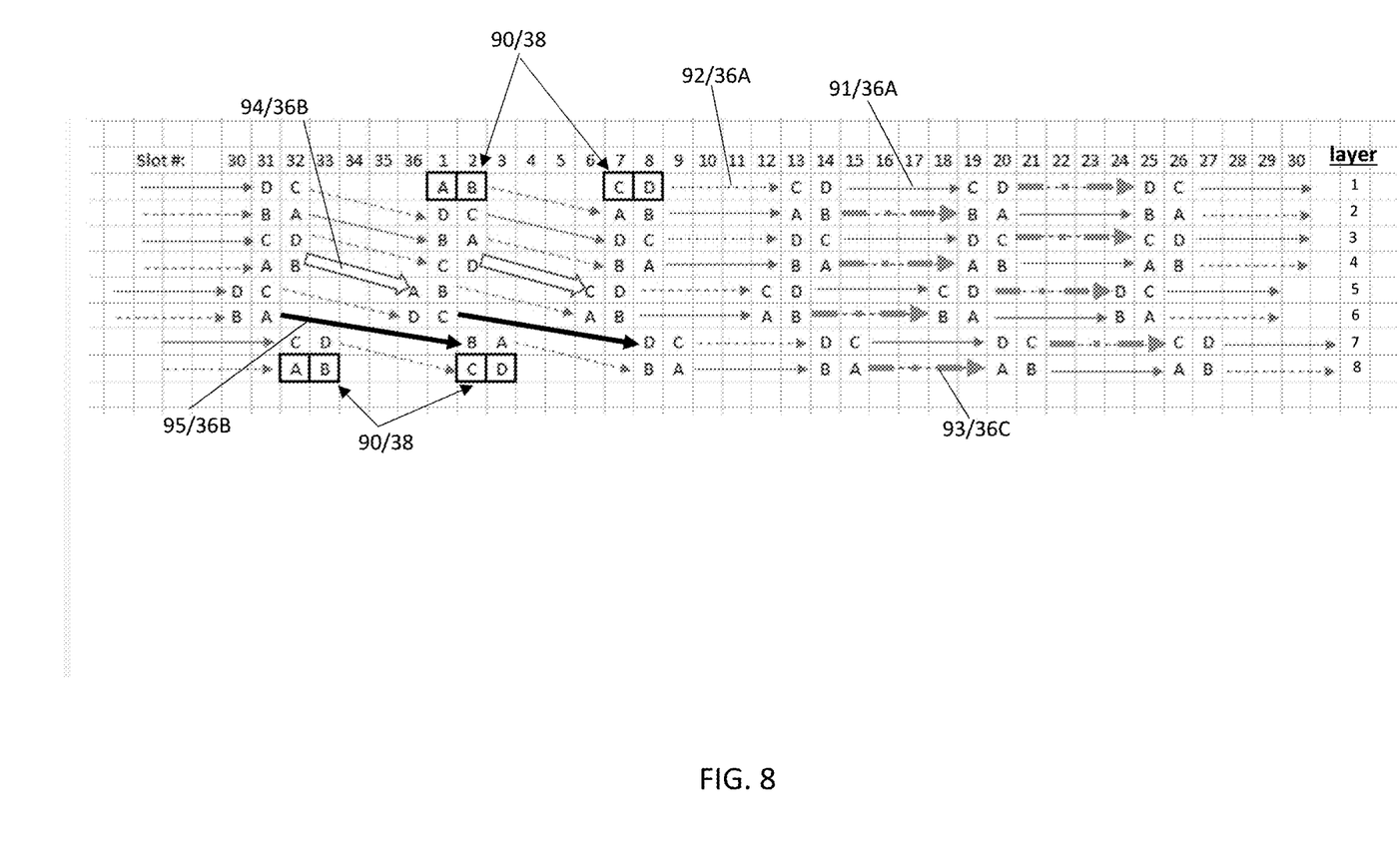
FIG. 8 is a tabular diagram of the winding arrangement of FIGS. 6A-7 showing the complete arrangement of four conductor paths for one phase of the windings, wherein all conductor paths are connected in parallel to provide for four parallel conductor paths.

As noted previously, the paths of each phase may be connected differently to result in either two or four parallel paths per phase. FIG. 8 is a tabular diagram of one complete phase of the winding arrangement of FIGS. 6A-7 with the four conductor paths (A-D) are all connected in parallel. The following provides a legend for the diagram:

- the boxes 90 in identified slots represent leads 38;
- thin continuous arrows 91 represent standard end turns 36A having a pitch of six on the lead side of the stator core;
- thin dashed arrows 92 represent standard end turns 36A having a pitch of six on the opposite side of the stator core;
- alternating thick and thin dashed arrows 93 represent nested end turns 36C having over-under pitches of five and seven, respectively;
- thick and hollow continuous arrows 94 represent non-standard/phase shift end turns 36B having a pitch of five;
- thick and solid continuous arrows 95 represent non-standard/phase shift end turns 36B having a pitch of eight;
- all non-dashed/continuous arrows represent end turns extending between the slots on the lead side of the stator core; and
- all dashed arrows represent end turns extending between the slots on the opposite side of the stator core (i.e., opposite the lead side).

As shown in FIG. 8, the leads 38 extend from both the outer layer (e.g., layer 1, or alternatively, layer 8) and the inner layer (e.g., layer 8, or alternatively, layer 1) of the stator core. Each path (A, B, C, D) includes one lead on the inner layer and one lead on the outer layer. All of the leads 38 of the inner layer are connected, and all of the leads of the outer layer are connected. This results in a four parallel path per phase winding arrangement. While the diagram of FIG. 8 illustrates the windings as a cascade winding arrangement (e.g., continuously wound copper wires), segmented windings could also be used. In the embodiment with segmented windings, the diagram of FIG. 8 would be similar except AB and CD wires would alternate layers 1 and 2 and so forth. In other words, FIG. 8 shows the arrangement for a winding comprised of continuous cascaded conductors; in the event of segmented conductors (aka "hairpins"), the segmented conductors would alternate in layers from one slot set to the next (e.g., path A would alternate from between layers 1 and 2 for the first wrap, between layers 3 and 4 for the second wrap, between layers 5 and 6 for the third wrap, and between layers 7 and 8 for the fourth wrap).

Figure 9:
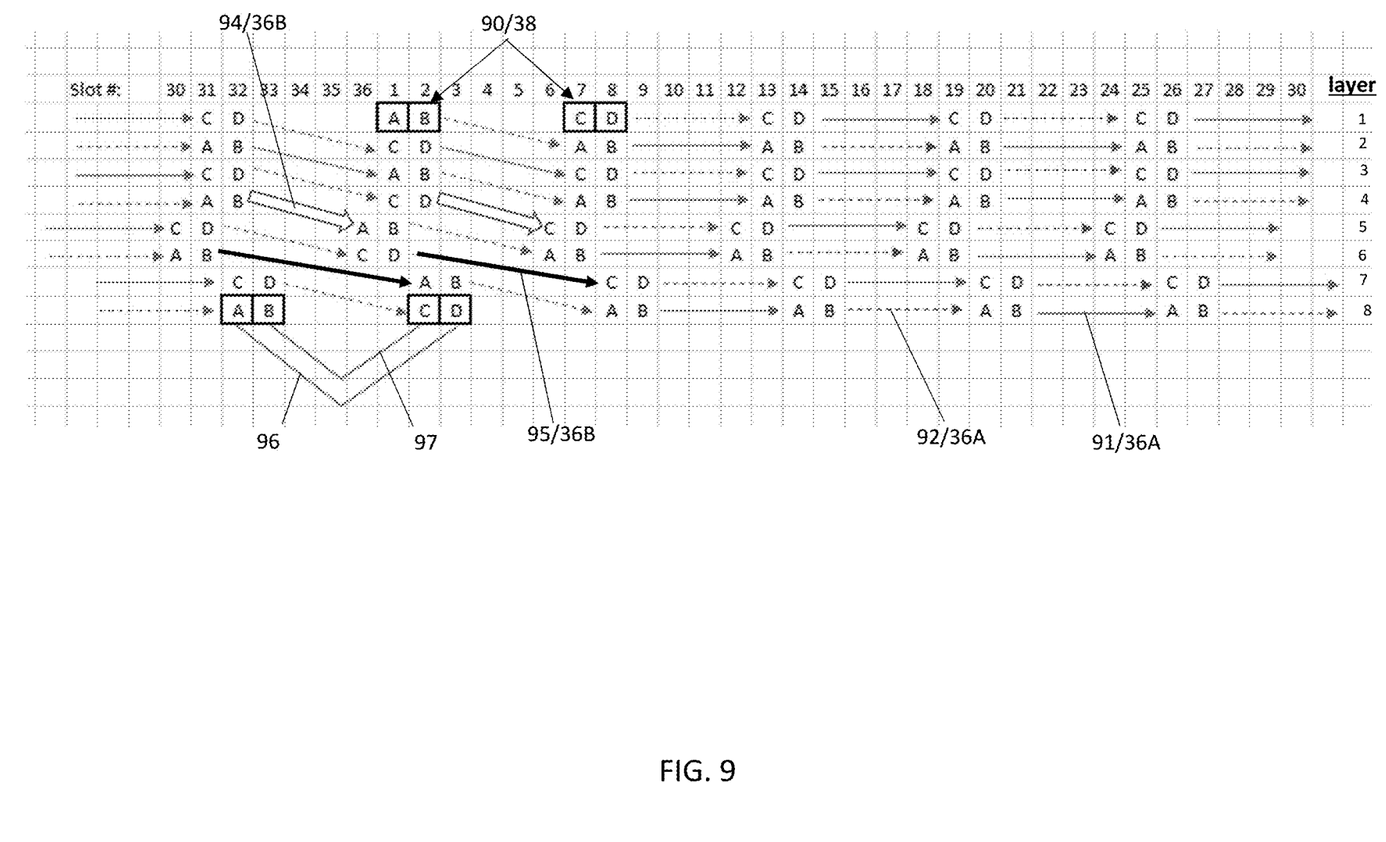
FIG. 9 is a tabular diagram of the winding arrangement of FIGS. 6A-7 showing the complete arrangement of four conductor paths for one phase of the windings, wherein a first series path is formed by a first and a second conductor path, a second series path is formed by a third and a fourth conductor path, and the first and second series paths are connected in parallel.

FIG. 9 is a tabular diagram showing a similar winding arrangement as that of FIG. 8, but pairs of the four conductor paths (A-D) in FIG. 9 are connected in series, resulting in a winding arrangement with two parallel conductor paths that switch direction in the middle of the winding arrangement. In particular, as shown by the illustrated connections at the bottom of FIG. 9, path A and D are connected in series by busbar connection 96, and paths B and C are connected in series by busbar connection 97. This results in a winding arrangement with two parallel paths (i.e., path A-D, and path B-C), wherein each winding changes direction at a mid-point (i.e., path A-D changes direction on the stator at the connection 96 between A and D in layer 8, and path B-C changes direction on the stator at the connection 97 between layers B and C in layer 8. This results in a winding arrangement with two parallel paths, including a first set of connected entry leads in layer 1 (noted by box A-B), and a second set of connected exit leads in layer 1 (noted by box C-D). Unlike the winding arrangement of FIG. 8, the winding arrangement of FIG. 9 does not require any nested end turns.

Although the various embodiments of winding arrangement having multiple shifts in the phase belt have been provided herein, it will be appreciated by those of skill in the art that other implementations and adaptations are possible. As mentioned previously, in at least some embodiments other slot configurations can utilize nested over/under pitches, and/or short pitches and long pitches to achieve similar patterns. Examples of these short/long patterns include each of the configurations listed below, wherein the pattern depends on (i) the number (N) of wires in a slot and (ii) the number of slots per pole per phase for the winding.

2 slots per pole per phase and N wires in a slot:
2-(N-2)-(N-2)-2
or
4-(N-4)-(N-4)-4

3 slots per pole per phase and N wires in a slot:
2-(N-2)-(N-2)-(N-2)-2
or
4-(N-4)-(N-4)-(N-4)-4

4 slots per pole per phase and N wires in a slot:
2-(N-2)-(N-2)-(N-2)-(N-2)-2
Or
4-(N-4)-(N-4)-(N-4)-(N-4)-4

Stator Core Configured to Retain Winding Arrangement

Figure 10:
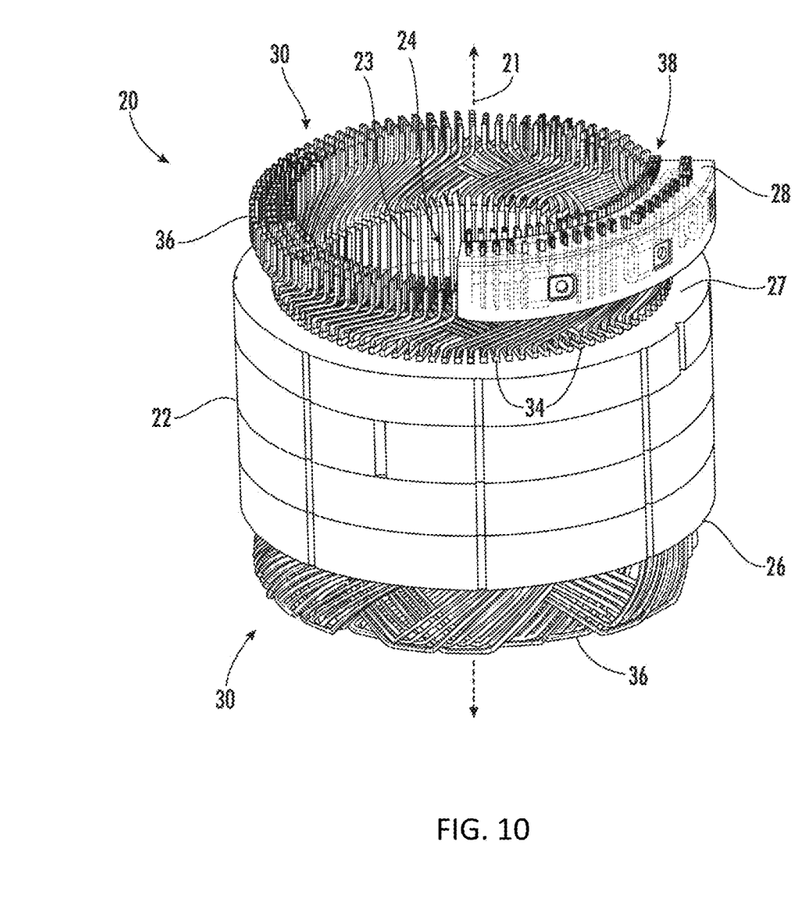
FIG. 10 is a perspective view of a stator incorporating the one of the embodiments of the winding arrangement shown and described in FIGS. 1-9.

With reference now to FIG. 10, a stator 20 is shown including a stator core 22 with the above described winding arrangement 30 positioned thereon. The stator core 22 is comprised of a ferromagnetic material and is typically formed from a plurality of steel sheets that are stamped and stacked upon one another to form a lamination stack, as will be recognized by those of ordinary skill in the art. As shown in FIG. 10, the stator core 22 is generally cylindrical in shape as defined by a center axis 21 and two ends 26, 27. The stator core 22 further includes an inner perimeter surface defining an inner diameter of the core 22, and an outer perimeter surface defining an outer perimeter of the core 22. A plurality of teeth 23 are formed on the interior portion of the stator core 22 and are directed inwardly toward the center axis 21. Each tooth 23 extends radially inward and terminates at the inner perimeter surface.

Axial slots 24 are formed in the stator core 22 between the teeth 23. The slots 24 may be open along the inner perimeter surface of the stator core 22, or may be semi-closed slots with each slot having a smaller width near the inner perimeter surface than the width closer to the outer perimeter surface. Openings to the slots 24 are provided between the teeth 23 (i.e., through the inner perimeter surface) as well as through both ends 26, 27 of the stator core 22. Each slot 24 is defined between adjacent teeth 23, with two adjacent teeth forming two opposing radial walls for one slot.

The stator core 22 is configured to retain the winding arrangement 30 within the slots 24 of the stator core 22. As noted above, the winding arrangement 30 (which, again, may also be referred to as simply a "winding" or "windings") is formed from a plurality of elongated wires (e.g., copper wires) that are cascaded/continuously wound within the slots 24 on the stator core 22 in order to form the windings. In at least one alternative embodiment, the winding arrangement 30 is formed from a plurality of segmented conductors, as is known to those of ordinary skill in the art.

The segmented conductors are inserted into the slots 24 from a first end 26 (e.g., an "insertion end") of the stator core 22. The segmented conductors are connected together at an opposite end 27 (e.g., a "weld end" or "lead end") of the stator core 22.

As noted previously, the conductors of the completed winding arrangement 30 form a plurality of phase windings. In at least one embodiment, the winding arrangement includes three phase windings (e.g., phase U windings, phase V windings, and phase W windings) with multiple winding paths for each phase (e.g., paths A, B, C and D, as described above), with multiple wraps around the stator for each path (e.g., four wraps per path). Also, in the embodiment disclosed herein, the number of slots-per-pole-per-phase for the winding is four. However, windings with a different number of slots-per-pole-per phase may be implemented (e.g., two or three) in other embodiments.

The conductors that form the completed windings on the stator core include in-slot portions 34, end turns 36, and winding leads 38. The in-slot portions 34 are straight portions of the conductors located within the slots 24 of the stator core 22. Each in-slot portion 34 carries current from one end 26/27 of the stator core 22 to the opposite end 27/26 of the stator core. As will be recognized by those of skill in the art, the in-slot portions 34 may be aligned in a single file line in each slot, and each position in the line is referred to a conductor "layer" of the slot. In the embodiments of the windings 30 shown in the figures, each slot 24 includes six layers of conductors arranged in a single file line from an inner layer to an outer layer. However, it will be recognized that in other embodiments, each slot 24 may include fewer or more than six layers of conductors.

With continued reference to FIG. 10, the end turns 36 are the conductor portions where a change of direction for the conductor occurs outside of the slots 24 at an end of the stator core 22. As noted previously, the end turns 36 may include bent portions and/or welded portions of the conductors. Each end turn 36 includes a conductor that exits one slot at an end of the stator core 14, is bent/twisted away from the slot (i.e., at a first degree), forms an end loop (e.g., a "U-turn" or other 180° change of direction), is bent/twisted toward a different slot (at a complementary second degree), and then enters that different slot on the same end of the stator core. As such, each end loop 36 extends between two in-slot portions 34 and across a number of slots at an end of the stator core 22, thus defining a "pitch" for the end turn. In embodiments wherein the windings are formed from segmented conductors, the end turns 36 on the insertion end 26 of the core are formed from a single bent wire, and the end turns 36 on the weld end 27 of the core are formed from two segmented conductors having adjacent aligned leg ends that are welded together. The end turns 36 are collectively represented in FIG. 10 by a conglomeration of conductors that form a disc-like shape at each end of the 26/27 of the stator core 22.

The winding leads 38 are conductor portions that provide an entry/exit to one of the winding paths. Each conductor forming a winding lead 38 is connected to an in-slot portion of the windings. In particular, each winding lead 38 exits a slot 24, and is typically bent/twisted to some degree, similar to the end turns. The lead then extends in an axial direction away from the end turns 36 to a point where the lead 38 terminates, axially outward from the end turns 36. As shown in FIG. 10 each end of the lead is joined to a bus bar/conductor provided within the bus bar assembly 28. It will be recognized that the connection between the leads 38 and the conductors in the bus bar assembly 28 may take any of various forms, such as soldering or welding (e.g., a tungsten inert gas (TIG) weld).

As will be recognized by those of ordinary skill in the art, the stator, including the stator core 22 and winding arrangement 30, is configured for use in an electric machine. The winding arrangement 30 advantageously provides an electric machine with reduced torque ripple and reduced audible noise compared to conventional electric machines. Accordingly, an electric machine utilizing the stator described herein may be advantageously used in applications where reduced audible noise and reduced torque ripple are particularly desired.

Various embodiments of a stator with multiple shifts in the phase belt have been described herein. It will be recognized that aspects of the various embodiments described herein may be combined or substituted with aspects from other features to arrive at different embodiments from those described herein. Thus, it will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the appended claims.

What is claimed is:

1. A stator for an electric machine, the stator comprising:
a stator core with slots formed in the stator core; and
a multi-phase winding arrangement positioned on the stator core, each phase of the winding arrangement including a plurality of conductors defining in-slot portions and end-turns connecting the in-slot portions, the in-slot portions arranged in layers in each of the slots, the plurality of conductors further defining a plurality of paths winding through the layers of the slots, each path of the plurality of paths making at least four wraps around the stator core and comprising:
a first phase shift end turn connecting in-slot portions located in a first pair of layers;
a second phase shift end turn connecting in-slot portions located in a second pair of layers different from the first pair of layers; and
at least one pair of nested end turns provided along said path in association with another of the plurality of paths, wherein the pair of nested end turns comprise an over end turn extending over an under end turn, wherein a pitch of the over end turn is two more than a pitch of the under end turn; and
wherein the end-turns for said path include mostly standard end turns and at least two non-standard end turns, wherein the standard end turns are defined by a standard pitch and the non-standard end turns are defined by non-standard pitches different than the standard pitch.

2. The stator of claim 1 wherein each pole of the winding arrangement is defined by a slot set having four slots with conductors arranged in the four slots in a 2-6-6-2 layer configuration.

3. The stator of claim 2 wherein the non-standard end turns are phase shift end turns, and each phase shift end turn connects two of the at least four wraps of each path.

4. The stator of claim 3 wherein the non-standard end turns include a first non-standard end-turn connecting the first wrap to the second wrap of each path, and a second non-standard end turn connecting a third wrap to a fourth wrap of each path.

5. The stator of claim 4 wherein the standard pitch is six and the non-standard pitches are seven.

6. The stator of claim 4 wherein the non-standard end turns further include a third non-standard end turn connecting the second wrap to the third wrap of said path, wherein the standard pitch is six, the non-standard pitch for the first non-standard end turn is five, and the non-standard pitch for the second non-standard end turn is seven, and the non-standard pitch of the third non-standard end turn is seven.

7. The stator of claim 3 wherein the non-standard end turns include a first non-standard end-turn connecting a second wrap to a third wrap of said path, and a second non-standard end turn connecting the third wrap to a fourth wrap of said path, wherein the standard pitch is six, the non-standard pitch for the first non-standard end turn is five, and the non-standard pitch for the second non-standard end turn is eight.

8. The stator of claim 1 wherein the non-standard end turns include phase shift end turns, wherein the plurality of paths include four paths.

9. The stator of claim 8 wherein the four paths are connected in parallel.

10. The stator of claim 9 wherein the non-standard end turns include a plurality of nested end turns on a non-lead side of the stator core, and a plurality of phase shift end turns interleaved on a lead side of the stator core.

11. The stator of claim 10 wherein the nested end turns include first short pitch end turns having a pitch of five nested within first long pitch end turns having pitch of seven, wherein the phase shift end turns include interleaved second short pitch end turns having a pitch of five and second long pitch end turns having a pitch of eight.

12. The stator of claim 8 wherein a first series path is defined by a first path and a second path connected in series, wherein a second series path is defined by a third path and a fourth path connected in series, and wherein the first series path and the second series path are connected in parallel.

13. The stator of claim 12 wherein the non-standard end turns include phase shift end turns interleaved on a lead side of the stator core and nested end turns on an opposite side of the stator core.

14. The stator of claim 13 wherein the nested end turns include a first short pitch end turn having a pitch of five nested within first long pitch end turn having pitch of seven, wherein the phase shift end turns include interleaved second short pitch end turns having a pitch of five and interleaved second long pitch end turns having a pitch of eight.

15. The stator of claim 1 wherein the plurality of conductors are segmented conductors.

16. The stator of claim 1 wherein the plurality of conductors are continuous cascaded conductors.

17. The stator of claim 1 wherein each of the at least four wraps traverse a same direction around the stator core.

18. The stator of claim 17 wherein each of the at least one of the at least four wraps is comprised of one continuous wire without a series connection along the one continuous wire.

19. The stator of claim 17 wherein at least one of the at least four wraps does not include a reversing end loop.

20. The stator of claim 1 wherein each path of the plurality of paths makes exactly four wraps around the stator core.

21. The stator of claim 1 wherein each path of the plurality of paths is comprised of a continuous conductor without a series connection.

22. A stator for an electric machine, the stator comprising:
a stator core with slots formed in the stator core; and
a multi-phase winding arrangement positioned on the stator core, each phase of the winding arrangement including a plurality of conductors defining in-slot portions and end-turns connecting the in-slot portions, the in-slot portions arranged in layers in each of the slots, the plurality of conductors further defining a phase belt comprising a plurality of paths winding through the layers of the slots, each path of the plurality of paths making at least four wraps around the stator core with each of the at least four wraps traversing around the stator core in a same direction and at least two wraps of the at least four wraps including:
a first phase shift end turn connecting in-slot portions located in a first pair of layers,
a second phase shift end turn connecting in-slot portions located in a second pair of layers different from the first pair of layers, and
at least one nested end turn, wherein a pair of nested end turns is provided by an over end turn extending over an under end turn with a pitch of the over end turn two greater than a pitch of the under end turn,
wherein each pole of each phase of the winding arrangement is defined by a slot set having four slots with conductors arranged in the four slots in a 2-6-6-2 layer configuration.

23. The stator of claim 22 wherein each slot includes eight layers of conductors, and wherein the 2-6-6-2 layer configuration is defined by one conductor in each of layers one and two of a first slot, one conductor in each of layers one through six of a second slot, one conductor in each of layers three through eight of a third slot, and one conductor in each of layers seven and eight of a fourth slot.

24. The stator of claim 23 wherein the plurality of paths of the phase belt includes four paths, each path making four wraps around the stator core, wherein a first series path is defined by a first path and a second path connected in series, wherein a second series path is defined by a third path and a fourth path connected in series, and wherein the first series path and the second series path are connected in parallel.

25. The stator of claim 23 wherein the plurality of paths of the phase belt includes four paths connected in parallel.

* * * * *